US008862316B2

(12) United States Patent
Protin et al.

(10) Patent No.: US 8,862,316 B2
(45) Date of Patent: Oct. 14, 2014

(54) METHOD AND DEVICE FOR DIAGNOSING THE OPERATIONAL STATE OF A FUEL SUPPLY SYSTEM OF AN AUTOMOBILE INTERNAL COMBUSTION ENGINE

(75) Inventors: Nicolas Protin, Versailles (FR); Michel Leporcq, Saint Genevieve des Bois (FR)

(73) Assignee: Renault S.A.S., Boulogne Billancourt (FR)

( * ) Notice: Subject to any disclaimer, the term of this patent is extended or adjusted under 35 U.S.C. 154(b) by 374 days.

(21) Appl. No.: 13/319,243

(22) PCT Filed: May 7, 2010

(86) PCT No.: PCT/FR2010/050882
§ 371 (c)(1),
(2), (4) Date: May 21, 2012

(87) PCT Pub. No.: WO2010/128262
PCT Pub. Date: Nov. 11, 2010

(65) Prior Publication Data
US 2012/0232748 A1 Sep. 13, 2012

(30) Foreign Application Priority Data
May 7, 2009 (FR) .................................... 09 53072

(51) Int. Cl.
G06F 11/30 (2006.01)
F02D 41/22 (2006.01)
F02D 41/00 (2006.01)
F02D 41/04 (2006.01)
F02D 19/08 (2006.01)
F02D 19/06 (2006.01)
F02D 41/14 (2006.01)

(52) U.S. Cl.
CPC .............. *F02D 19/088* (2013.01); *F02D 41/22* (2013.01); *F02D 41/0025* (2013.01); *Y02T 10/36* (2013.01); *F02D 19/0628* (2013.01); *F02D 41/047* (2013.01); *F02D 41/1441* (2013.01); *F02D 2200/0612* (2013.01); *F02D 2250/11* (2013.01); *Y02T 10/40* (2013.01); *F02D 19/084* (2013.01); *F02D 19/0623* (2013.01); *F02D 41/1495* (2013.01)

USPC ....... 701/34.4; 701/29.1; 701/32.8; 701/33.1; 701/33.9

(58) Field of Classification Search
CPC ... F02D 41/0025; F02D 41/047; F02D 41/22; F02D 41/1441; F02D 41/1438; F02D 41/1495; F02D 19/08; F02D 19/081; F02D 19/082; F02D 19/084; F02D 19/085; F02D 19/087; F02D 19/088; F02D 19/0623; F02D 19/0628; F02D 2200/0611; F02D 2200/0612; F02D 2250/11; F02D 19/06; F02D 19/0602; F02D 19/0626; F02D 19/0634; F02D 19/0636; F02D 19/0639; F02D 19/0649; F02D 19/0652; F02D 19/0655; F02D 41/0027; F02D 41/0037; F02D 41/0047; Y02T 10/36
USPC ............ 701/34.4, 29.1, 33.1, 33.6–33.8, 34.3
See application file for complete search history.

(56) References Cited

U.S. PATENT DOCUMENTS 5,881,703 A 3/1999 Nankee et al.
6,041,278 A 3/2000 Kennie et al.
(Continued)

FOREIGN PATENT DOCUMENTS

EP 1 304 466 4/2003
WO 2008 072068 6/2008
WO 2009 022212 2/2009

OTHER PUBLICATIONS

International Search Report Issued Sep. 17, 2010 in PCT/FR10/050882 Filed May 7, 2010.

*Primary Examiner* — Jerrah Edwards
(74) *Attorney, Agent, or Firm* — Oblon, Spivak, McClelland, Maier & Neustadt, L.L.P.

(57) ABSTRACT

The invention relates to a method for diagnosing the operational state of a fuel supply system of an automobile internal combustion engine, said fuel being stored in a tank of the vehicle and having a variable alcohol content, wherein said method includes a step of diagnosing (S6) the operational state of the fuel supply system, a step of detecting the addition of alcohol into the tank (S2), a step of determining the alcohol content (S2bis) in the fuel, and a checking step (S4) in which the diagnosis step (S6) is triggered if the step of determining the alcohol content (S2bis) in the fuel is completed.

6 Claims, 3 Drawing Sheets

(56) References Cited

U.S. PATENT DOCUMENTS

| | | | |
|---|---|---|---|
| 7,311,094 B2* | 12/2007 | Mallebrein et al. | 123/698 |
| 8,011,232 B2 | 9/2011 | Protin et al. | |
| 2003/0075119 A1* | 4/2003 | Huff et al. | 123/1 A |
| 2004/0099252 A1* | 5/2004 | Nagaishi et al. | 123/480 |
| 2004/0182378 A1 | 9/2004 | Oshimi et al. | |
| 2009/0064977 A1* | 3/2009 | Miersch-Wiemers et al. | 123/674 |
| 2010/0031941 A1 | 2/2010 | Hokuto | |
| 2011/0030665 A1 | 2/2011 | Protin et al. | |

* cited by examiner

METHOD AND DEVICE FOR DIAGNOSING THE OPERATIONAL STATE OF A FUEL SUPPLY SYSTEM OF AN AUTOMOBILE INTERNAL COMBUSTION ENGINE

The invention relates to the diagnostics of the operational state of an internal combustion engine fuel supply system.

BACKGROUND

In particular, the invention relates to a motor vehicle combustion engine.

The invention advantageously applies to internal combustion engines running either on gasoline or on alcohol, for example ethanol, or on a variable proportion of these two fuels.

As pollution-reducing standards become increasingly strict, it is necessary to check the combustion of the fuel in motor vehicle engines in order to have control over the pollution emitted by these engines. It is therefore necessary to monitor the fuel supply system of these engines in order to alert the driver, using a warning lamp, to any failure of the system which will cause the pollution thresholds to be crossed.

Such monitoring may be disrupted when the fuel used contains a variable alcohol content. Further, the phenomenon known as "blow-by", whereby fuel vapors mix with the oil vapors from the engine oil sump, has a not-insignificant effect on the monitoring of the operational state of the fuel supply system. Further, the higher the alcohol content of the fuel, the more significant this blow-by phenomenon becomes.

At the present time, fuel supply circuit diagnostics are based on the monitoring of various parameters used to regulate the richness of the exhaust gases entering a catalytic converter on the basis of information delivered by a richness probe, also known as a lambda probe. What is meant by the "richness of the exhaust gases" is the quantity of oxygen present in the exhaust gases. In the case of an engine running on a single type of fuel, monitoring the variation in these parameters gives an idea of the level of failure of the fuel supply circuit. In the case of an engine which runs on a fuel containing a variable alcohol content, the parameters used to regulate the richness of the exhaust gases vary, not because of system failure, but because of the variation in the alcohol content. Specifically, the variation in the alcohol content leads to a variation in the amount of fuel that has to be injected in order to keep the richness on the outlet side of the engine constant for a given engine operating point. That being so, the monitored parameters vary without there being in any way any degradation in the fuel supply circuit, so the risk of detecting a failure state as a result of a change of fuel is therefore very high.

Further, the regulation used to set the richness of the exhaust gases can differ widely according to the type of fuel, because the corrector that regulates the richness is set according to the alcohol content of the fuel.

However, at the present time, diagnostics do not take the alcohol content of the fuel into consideration and so whatever the alcohol content used, their reliability is therefore not guaranteed.

Mention may be made of French patent application FR2892769, filed in the name of the Applicant Company, which describes a method for recognizing an alcohol content of the fuel of a motor vehicle on the basis of the measurement of the richness of the exhaust gases, which measurement is made by a richness probe. However, that document does not describe a means for diagnosing the operational state of the fuel supply system of the vehicle.

There is another problem that occurs when using alcohol-containing fuels. When the alcohol content of the tank is high enough, some of the alcohol injected enters the oil of the engine oil sump, and then under certain conditions, the fuel evaporates and enters the intake manifold. This phenomenon has the effect of disrupting the exhaust gas richness regulation, the parameters used for monitoring the fuel supply circuit, and therefore the diagnostics of the operational state of the engine fuel supply system.

BRIEF SUMMARY

It is one of the objects of the invention to provide a method and a device for monitoring the operational state of the fuel supply system for a fuel containing a variable alcohol content.

One aspect of the invention provides a method for diagnosing the operational state of a motor vehicle internal combustion engine fuel supply system, said fuel being stored in a tank of the vehicle and containing a variable alcohol content.

This method comprises a step of diagnosing the operational state of the fuel supply system, a step of detecting an addition of fuel to the tank, a step of determining the alcohol content of the fuel, and a checking step in which the diagnostics step is initiated if the step of determining the alcohol content of the fuel is finished.

Thus, the results of the diagnostics are not taken into consideration when the fuel is changed until the alcohol content of the fuel has been correctly detected, this being so as not to diagnose a failure of the fuel supply system when it may just be that there has been a normal change of fuel.

Advantageously the method comprises a step of detecting an evaporation of the fuel diluted in the engine oil and, during the checking step, the diagnostics step is initiated if evaporation of the fuel diluted in the engine oil is not detected.

The results of the diagnostics are not taken into consideration either in the case of blow-by being present, this being so as not to declare the fuel supply system to have failed when it may in fact be exhibiting normal behavior.

The method may also comprise a calibration step in which diagnostics parameters intended for the diagnostics step are calculated from the determined alcohol content.

The parameters of the diagnostics can thus be calibrated according to the alcohol content of the fuel in order to guarantee the reliability of the diagnostics whatever the alcohol content of the fuel.

In one embodiment, during the calculation of the diagnostics parameters, upper and lower boundaries of a diagnostics interval are calculated from the determined alcohol content and, during the diagnostics step, a diagnostics criterion is calculated, the criterion is compared against the diagnostics interval and a failure state is diagnosed if the diagnostics criterion is outside of the diagnostics interval.

Advantageously, during the calculation of the diagnostics parameters, a diagnostics time is calculated from the determined alcohol content, and, during the diagnostics step, the diagnostics criterion is calculated during the calculated diagnostics time.

Another aspect of the invention provides a device for diagnosing the operational state of a motor vehicle internal combustion engine fuel supply system, said fuel being stored in a tank of the vehicle and containing a variable alcohol content.

This device comprises a diagnostics means for diagnosing the operational state of the fuel supply system, a detection means for detecting an addition of fuel to the tank, a determining means for determining the alcohol content of the fuel and a checking means for activating the diagnostics means if the determining means has determined the alcohol content in the fuel.

Advantageously, the device comprises a second detection means for detecting evaporation of the fuel diluted in the engine oil, the checking means being capable of activating the diagnostics means if the second detection means does not detect evaporation of the fuel diluted in the engine oil.

The device may further comprise a calibration means for calculating diagnostics parameters, intended for the diagnostics means, from the determined alcohol content.

According to one embodiment, the calibration means is capable of calculating upper and lower boundaries of a diagnostics interval from the determined alcohol content, and the diagnostics means comprises a means for calculating a diagnostics criterion, a means for comparing the diagnostics criterion against the diagnostics interval, and a means for formulating a failure state signal if the diagnostics criterion is outside of the diagnostics interval.

Advantageously, the calibration means is capable of calculating a diagnostics time from the determined alcohol content, and the diagnostics means comprises a means for calculating the diagnostics criterion during the calculated diagnostics time.

BRIEF DESCRIPTION OF THE DRAWINGS

Further objects, features and advantages of the invention will become apparent from reading the following description, given solely by way of nonlimiting example and by making reference to the attached drawings in which.

DETAILED DESCRIPTION

Figure 1:
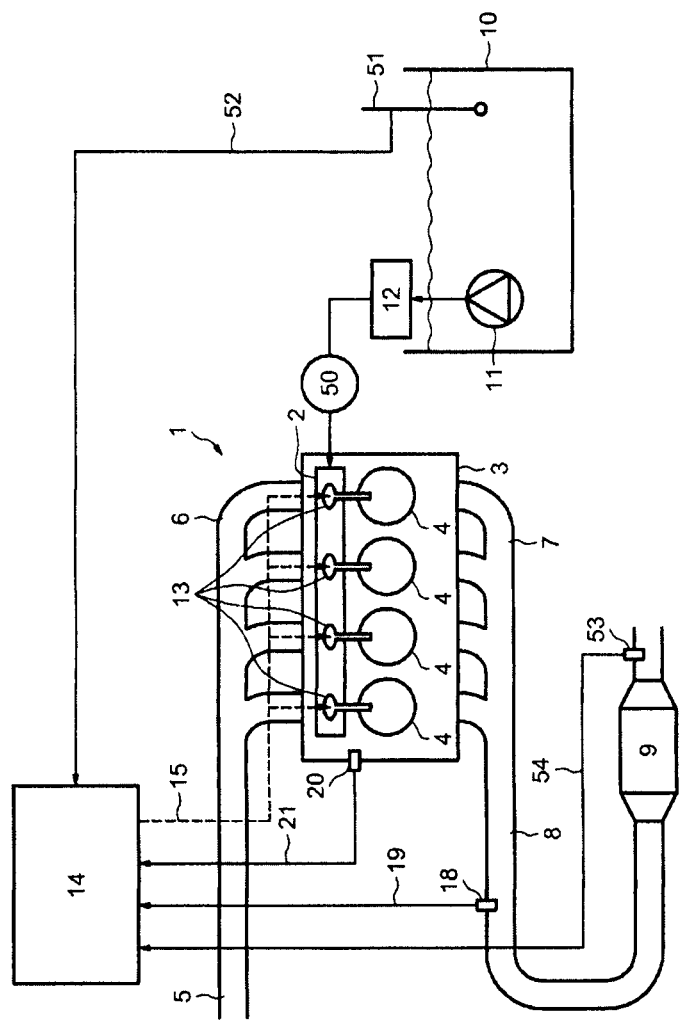
FIG. 1 schematically illustrates a device for diagnosing the operational state of a motor vehicle internal combustion engine fuel supply system.

FIG. 1 schematically depicts a device 1 for diagnosing the operational state of a motor vehicle internal combustion engine 3 fuel supply system 2.

The internal combustion engine 3 has at least one cylinder 4. This internal combustion engine 3 comprises a fresh air supply pipe 5 which carries air to an intake manifold 6 of the engine 3.

The exhaust gases from the engine 3 are collected by an exhaust manifold 7 then removed via an exhaust pipe 8 on which an exhaust gas treatment member 9 is mounted.

The exhaust gas treatment member 9 may be a particulate filter, a nitrogen oxides trap, a catalytic converter, or a combination of the three.

The engine 3 is supplied with fuel which is stored in a main tank 10.

The stored fuel is carried to a fuel injector 13 associated with each cylinder 4 of the engine 3, via a pump 11, a filter 12 and a pressure regulator 50.

The fuel supply system 2 comprises said fuel injector, said pump 11, said filter 12, said pressure regulator 50 and the pipes which carry the fuel from the main tank 10 to the fuel injector 13.

An electronic control unit ECU 14 controls the opening time of each fuel injector 13, via a connection 15. This control over the opening time of each fuel injector 13 notably makes it possible to adjust the air/fuel mixture admitted to the engine with respect to a given exhaust gas richness value.

The device 1 also comprises a richness probe 18 which emits a measurement of the richness of the exhaust gases, transmitted via a connection 19 to the ECU 14. In a preferred embodiment, the richness probe 18 is situated upstream of the exhaust gas treatment member 9. The device 1 may further comprise another oxygen probe 53 situated downstream of the exhaust gas treatment member 9. This richness probe 53 emits a measurement of the richness of the exhaust gases, transmitted via a connection 54 to the ECU 14.

The device 1 also comprises a fuel level gage 51 which emits information regarding the level of fuel present in the tank 10, which information is transmitted by a connection 52 to the ECU 14.

The device 1 further comprises a means 20 for emitting information relating to the operation of the engine 3, such as the engine 3 load and the engine 3 speed for example, these being transmitted to the ECU 14 by a connection 21.

Moreover, the ECU 14 comprises means for implementing a method to diagnose the operational state of the fuel supply system 2 of the internal combustion engine 3, such method being described later in FIGS. 2 and 3. These means for implementing the method can be run in the ECU 14 in the form of software and/or in the form of logic circuits.

Figure 2:
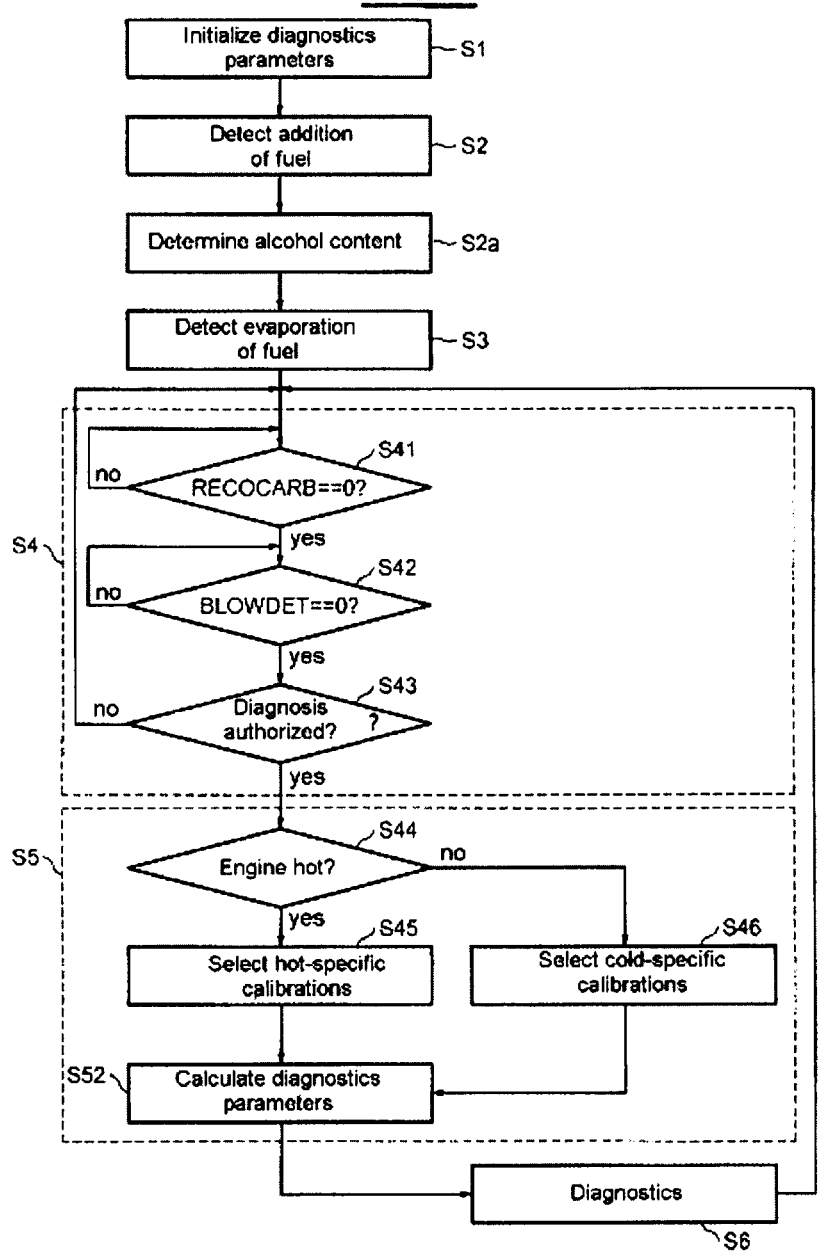
FIG. 2 schematically illustrates the main phases in a method for diagnosing the operational state of a motor vehicle internal combustion engine fuel supply system.

FIG. 2 schematically depicts the main phases of a method for diagnosing the operational state of a motor vehicle internal combustion engine fuel supply system.

This method comprises a step S1 of initializing the diagnostics parameters, then a step S2 of detecting an addition of fuel to the fuel, a step S2a of determining the alcohol content in the fuel, and a step S3 of detecting an evaporation of the fuel diluted in the engine oil. The method also comprises a checking step S4, a calibration step S5 and a step S6 of diagnosing the operational state of the fuel supply system.

In the step S1 of initializing the diagnostics parameters, all the diagnostics parameters used in the method are initialized, notably the following detection parameters:

RECOCARB=1;
BLOWDET=0;

RECOCARB: a detection parameter of boolean type which takes the value 1 if the step S2a of determining the alcohol content is active, that is to say if the step S2a is not finished, and which if not takes the value 0;

BLOWDET: a detection parameter of boolean type, which takes the value 1 if evaporation of the fuel has been detected during the step S3 of detecting evaporation of the fuel and which if not takes the value 0.

During the step S2 of detecting an addition of fuel, information emitted by the gage 51 regarding the level of fuel present in the tank is collected.

During the step S2a of determining the alcohol content, the alcohol content of the fuel is determined from exhaust gas richness information received by the richness probes 18 and 53. During this determining time, the exhaust gas richness setting is adjusted until a richness close to 1, that is to say close to the stoichiometric ratio between the mass of burnt fuel and the mass of oxygen present in the exhaust gases is obtained.

The alcohol content is determined by analyzing the measurement of the exhaust gas richness. If the composition of the exhaust gases is oxygen-lean, the fuel injection duration is lengthened by comparison with the previous injection duration. If the exhaust gas composition is oxygen-rich, the fuel injection duration is shortened by comparison with the previous injection duration. For example, use may be made of the method described in French patent application FR2892769 to determine the alcohol content of the fuel.

The determining step S2a makes it possible to determine the alcohol content CONTENT which represents the alcohol content of the fuel. The variable CONTENT varies between 0 and 1 and CONTENT is equal to 1 when the fuel is pure alcohol and is equal to 0 when the fuel is gasoline containing no alcohol.

When the step S2a of determining the alcohol content is finished, that is to say when the exhaust gas richness setting is stabilized, the detection parameter RECOCARB is updated, and adopts the value 0.

During the step S3 of detecting an evaporation of the fuel, the method detects whether the blow-by phenomenon is significant enough to disrupt the exhaust gas richness setting, and the BLOWDET detection parameter is updated accordingly. Detection of the blow-by phenomenon is performed by calculating the drift in exhaust gas richness.

In the checking step S4, a check is made to see whether the appropriate conditions are valid before carrying out the diagnostics step S6. The checking step S4 comprises test steps S41 to S43.

The test step S41 checks whether the step S2a of determining the alcohol content is finished. During this test step S41 the value of the parameter RECOCARB is tested and the next test step S42 is carried out if the detection parameter RECOCARB has the value 0, if not the test S41 is repeated.

The test step S42 checks whether any evaporation of the fuel has been detected. During this test step S42 the value of the parameter BLOWDET is tested and the next test step S43 is carried out if the detection parameter BLOWDET has the value 0, if not the test S42 is repeated.

The test step S43 checks additional conditions before carrying out the diagnostics step S6.

During this test step S43, checks are made to ensure that:
the exhaust gas richness regulation is in a closed loop;
injection is operating sequentially;
the engine load and speed are in a predefined zone; and
the richness probes 18 and 53 are not defective.

If these conditions are valid, the diagnostics is considered to be authorized and a calibration step S5 is performed, if not test step S41 is repeated.

This calibration step S5 begins with a test S44 on engine temperature.

In the test step S44, a check is made to determine whether the engine is hot. If the engine is hot, a first selection step S45 is performed in which hot-specific calibrations are selected, if not a second selection step S46 is performed in which cold-specific calibrations are selected. These calibrations are notably detection thresholds and times.

The calibration step also comprises a step S52 of calculating diagnostics parameters.

During this step S52 of calculating diagnostics parameters, a lower boundary S_MIN and an upper boundary S_MAX of a diagnostics interval are calculated and also a diagnostics number WINDOW and a diagnostics time TIME per diagnosis performed are calculated. The diagnostics parameter WINDOW corresponds to a number of diagnoses to be carried out before failure of the fuel supply system 2 is diagnosed.

These diagnostics parameters S_MIN, S_MAX, WINDOW and TIME are calculated from the alcohol content CONTENT determined in the determining step S2a. During the step S52 of calculating the diagnostics parameters, the following calculations are performed:

$$S\_MAX = S\_MAX\_ALCO \cdot CONTENT + (1 - CONTENT) \cdot S\_MAX\_GAS$$

$$S\_MIN = S\_MIN\_ALCO \cdot CONTENT + (1 - CONTENT) \cdot S\_MIN\_GAS$$

$$TIME = TIME\_ALCO \cdot CONTENT + (1 - CONTENT) \cdot TIME\_GAS$$

$$WINDOW = WINDOW\_ALCO \cdot CONTENT + (1 - CONTENT) \cdot WINDOW\_GAS$$

S_MAX_ALCO: is the calibrated maximum failure threshold for a fuel of the alcohol type;
S_MAX_GAS: is the calibrated maximum failure threshold for a fuel of the gasoline type;
S_MIN_ALCO: is the calibrated minimum failure threshold for a fuel of the alcohol type;
S_MIN_GAS: is the calibrated minimum failure threshold for a fuel of the gasoline type;
TIME_ALCO: calibrated diagnostics duration for a fuel of the alcohol type;
TIME_GAS: calibrated diagnostics duration for a fuel of the gasoline type;
WINDOW_ALCO: number of diagnoses to be carried out before declaring a fault for a fuel of the alcohol type; and
WINDOW_GAS: number of diagnoses to be carried out before declaring a fault for a fuel of the gasoline type.

Next, the diagnostics step S6 is carried out using the parameters thus calculated. Furthermore, the checking step S4 is permanently carried out throughout the duration of the diagnostics, and if the diagnostics are not authorized or if the variable RECOCARB is not zero or if the variable BLOWDET is not zero then the diagnosis is stopped 6 and the checking step S4 is repeated.

Figure 3:
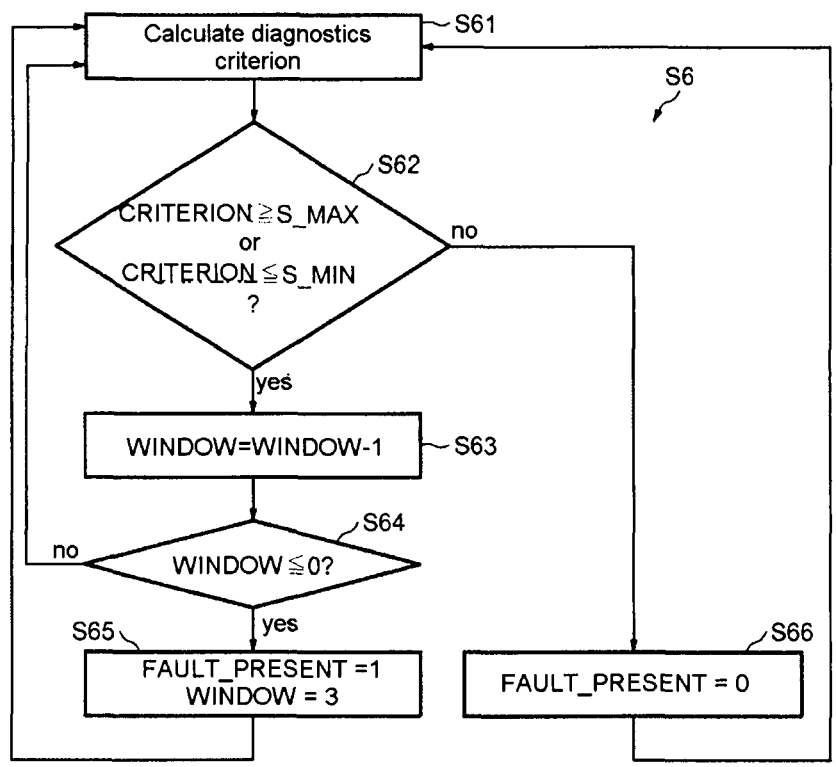
FIG. 3 schematically illustrates one embodiment of the step of diagnosing the operational state of the fuel supply system.

FIG. 3 schematically depicts one embodiment of the step S6 of diagnosing the operational state of the fuel supply system 2.

In one embodiment of the diagnostics method, the operational state of the fuel supply system 2 is monitored by monitoring the drift in exhaust gas richness. For example, the richness probes 18 and 53 are used to measure the richness of the exhaust gases and the drift in exhaust gas richness is analyzed in the ECU 14.

In order to regulate the richness of the exhaust gases, the ECU 14 comprises a means for calculating an effective injection time Teff using equation (1) as follows:

$$T\text{eff} = (B + ALPHACL \cdot GAIN \cdot A \cdot \text{Mair}) \cdot C \quad (1)$$

B: a shift variable taking account of drifts in the fuel supply system 2;
ALPHACL: an injection time correction factor for regulating the richness of the exhaust gases leaving the engine 3;
GAIN: a coefficient taking account of the drift in the hydraulic characteristics of the fuel supply system 2;
A: a factor taking account of various phenomena associated with the purging of the canister, the wetting of the walls, etc;
Mair: the mass of air admitted to the cylinder, either measured or estimated; and
C: a coefficient dependent on the alcohol content.

The effective injection time Teff is a variable the calculation of which is well known to those skilled in the art.

In order to detect failure of the fuel supply system 2, the diagnostics step S6 is based on monitoring a criterion, denoted CRITERION, the calculation of which is performed in calculation step S61 of calculating the diagnostics criterion. The monitoring criterion CRITERION is calculated using equation (2):

$$CRITERION = f(CRITERION1 + CRITERION2 + CRITERION3) \quad (2)$$

CRITERION is calculated as an integral of the sum of the three terms CRITERION1, CRITERION2, CRITERION3 defined hereinbelow, for the time TIME calculated during calibration step S5.

In equation (2):

CRITERION1: corresponds to the difference between the value of ALPHACL for which no correction to the injection time as a function of time is needed in order to achieve a richness equal to 1 in the exhaust, and the value of ALPHACL applied to the injection time in order to achieve a richness equal to 1 in the exhaust;

CRITERION2: corresponds to the difference between the instantaneous value of the shift variable B corresponding to use of a "theoretical" fuel supply system, namely one exhibiting no dispersion and no ageing, and the mean characteristic of which coincides with the value for which no modification to the injection time is applied, and the instantaneous value of the shift constant B applied to the injection time for a given vehicle (specific to each vehicle);

CRITERION3: corresponds to the difference between the instantaneous value of GAIN corresponding to the use of a "theoretical" fuel supply system, namely one with no dispersion and no ageing, and the mean characteristic of which coincides with the value for which no modification to the injection time is applied, and the instantaneous value of GAIN applied to the injection time for a given vehicle (specific to each vehicle).

When the alcohol content of the fuel varies following a filling of the tank 10, the step S2a of determining the alcohol content needs a certain amount of time in order to determine the alcohol content of the fuel. During this detection time, the parameters ALPHACL, GAIN and B vary until the alcohol content has been determined so as to determine the coefficient dependent on the alcohol content, which determination then allows the parameters ALPHACL, GAIN and B to return to a value close to their nominal value.

Further, because the diagnostics criterion CRITERION is dependent on these three parameters ALPHACL, GAIN and B, the values of these parameters in the step S2a of determining the alcohol content do not reflect the level of potential failure of the fuel supply system 2. Further, during this determining time, the diagnostics step S6 is liable to detect a breakdown even when the system is not defective.

When the step S2a of determining the alcohol content is finished, the regulator of the richness of the exhaust gases measured upstream of the treatment member 9 is set according to the determined alcohol content of the fuel. As a result, the parameters ALPHACL, GAIN and B can vary differently as a function of the alcohol content and therefore the values of the diagnostics criterion CRITERION can also fluctuate according to the composition of the fuel.

Moreover, the blow-by phenomenon also has an influence on the parameters ALPHACL, GAIN and B and therefore on the diagnostics criterion CRITERION.

After the step S61 of calculating the diagnostics criterion, a comparison S62 is made between the diagnostics criterion CRITERION and the diagnostics interval comprising the lower boundary S_MIN and the upper boundary S_MAX.

When the diagnostics criterion CRITERION lies within the diagnostics interval delimited by the two, lower and upper, boundaries, S_MIN and S_MAX, a FAULT_PRESENT counter is equal to zero S66, indicating that no failure has been detected in the fuel supply system 2.

When CRITERION is outside of the diagnostics interval, the variable WINDOW which was assigned an initial predetermined value, is decremented S63 by one, then the value of said variable WINDOW is tested S64:

if WINDOW>0, diagnostics resumes from step S61 of calculating the diagnostics criterion;

if WINDOW=0 then FAULT_PRESENT is equal to 1, indicating that a failure has been detected in the fuel supply system 2, then the variable WINDOW is reset S65.

The invention claimed is:

1. A method for diagnosing the operational state of a motor vehicle internal combustion engine fuel supply system, said fuel being stored in a tank of the vehicle and containing a variable alcohol content, the method comprising:

initializing diagnostic parameters, including setting an alcohol content detection parameter at a first value to indicate that the alcohol content of the fuel has not been determined;

detecting an addition of fuel to the tank;

determining the alcohol content of the fuel;

after the determining the alcohol content of the fuel, updating the alcohol content detection parameter to a second value to indicate that the alcohol content has been determined;

checking whether the alcohol content detection parameter has been updated to the second value to indicate that the alcohol content has been determined, including authorizing the diagnosing of the operational state of the fuel supply system after the checking determines that the alcohol content has been determined;

calibrating the diagnostics parameters based on the alcohol content determined by the determining; and initiating the diagnosing of the operational state of the fuel supply system using the calibrated diagnostics parameters.

2. The method as claimed in claim 1, in which, during the calibrating the diagnostics parameters, upper and lower boundaries of a diagnostics interval are calculated from the determined alcohol content and, during the diagnosing, a diagnostics criterion is calculated, the criterion is compared against the diagnostics interval and a failure state is diagnosed if the diagnostics criterion is outside of the diagnostics interval.

3. The method as claimed in claim 2, in which, during the calibrating the diagnostics parameters, a diagnostics time is calculated from the determined alcohol content, and, during the diagnosing, the diagnostics criterion is calculated during the calculated diagnostics time.

4. The method as claimed in claim 1, wherein the initializing the diagnostic parameters includes setting an evaporation detection parameter to a first value to indicate that evaporation of the fuel has not been detected, after the updating the alcohol content detection parameter, the evaporation of the fuel is detected and the evaporation detection parameter is updated, the checking includes testing a value of the updated evaporation detection parameter to determine if the evaporation of the fuel has been detected, and the diagnosing of the operational state of the fuel supply system is authorized if the checking determines from the updated evaporation detection parameter that the evaporation of the fuel has not been detected.

5. A system for diagnosing the operational state of a motor vehicle internal combustion engine fuel supply system, the system comprising:

a tank to store fuel containing a variable alcohol content;

a fuel gage to measure a level of the fuel in the tank; and an electronic control unit configured to:
    initialize diagnostic parameters, including setting an alcohol content detection parameter at a first value to indicate that the alcohol content of the fuel has not been determined;
    detect an addition of fuel to the tank based on measurements from the fuel gage;
    determine the alcohol content of the fuel;
    update, after determining the alcohol content of the fuel, the alcohol content detection parameter to a second value to indicate that the alcohol content has been determined;
    check whether the alcohol content detection parameter has been updated to the second value to indicate that the alcohol content has been determined, including authorizing the diagnosing of the operational state of the fuel supply system after the check determines that the alcohol content has been determined;
    calibrate the diagnostics parameters based on the determined alcohol content; and
    initiate the diagnosing of the operational state of the fuel supply system using the calibrated diagnostics parameters.

6. An electronic control unit storing a program that, when executed by the electronic control unit, causes the electronic control unit to execute:
    initializing diagnostic parameters for diagnosing an operational state of a motor vehicle internal combustion engine fuel supply system, including setting an alcohol content detection parameter at a first value to indicate that alcohol content of fuel stored in a tank of the vehicle has not been determined;
    detecting an addition of fuel to the tank;
    determining the alcohol content of the fuel;
    after the determining the alcohol content of the fuel, updating the alcohol content detection parameter to a second value to indicate that the alcohol content has been determined;
    checking whether the alcohol content detection parameter has been updated to the second value to indicate that the alcohol content has been determined, including authorizing the diagnosing of the operational state of the fuel supply system after the checking determines that the alcohol content has been determined;
    calibrating the diagnostics parameters based on the alcohol content determined by the determining; and
    initiating the diagnosing of the operational state of the fuel supply system using the calibrated diagnostics parameters.

* * * * *